United States Patent
Liefer et al.

(10) Patent No.: US 12,427,711 B1
(45) Date of Patent: Sep. 30, 2025

(54) SHEET METAL PROCESSING CELL FOR APPLYING WEB MATERIAL TO A SURFACE OF SHEET METAL AND METHOD THEREOF

(71) Applicant: Red Bud Industries, Inc., Red Bud, IL (US)

(72) Inventors: Kollin N. Liefer, Waterloo, IL (US); Dean C. Linders, Baldwin, IL (US)

(73) Assignee: Red Bud Industries, Inc., Red Bud, IL (US)

( * ) Notice: Subject to any disclaimer, the term of this patent is extended or adjusted under 35 U.S.C. 154(b) by 349 days.

(21) Appl. No.: 18/142,127

(22) Filed: May 2, 2023

(51) Int. Cl.
*B32B 41/00* (2006.01)
*B29C 63/00* (2006.01)
*B29C 63/02* (2006.01)
*B29L 7/00* (2006.01)

(52) U.S. Cl.
CPC ........ *B29C 63/024* (2013.01); *B29C 63/0004* (2013.01); *B29C 2793/0027* (2013.01); *B29L 2007/002* (2013.01)

(58) Field of Classification Search
CPC .............. B29C 63/024; B29C 63/0004; B29C 2793/0027; B29L 2007/002
USPC .................... 156/60, 64, 350, 351, 378, 379
See application file for complete search history.

(56) References Cited

U.S. PATENT DOCUMENTS

| | | |
|---|---|---|
| 4,773,609 A | 9/1988 | Steffen et al. |
| 5,007,522 A | 4/1991 | Focke et al. |
| 7,546,971 B2 | 6/2009 | Pappas |
| 7,984,603 B2 | 7/2011 | Freudenberg et al. |
| 2018/0065824 A1 * | 3/2018 | Erkelenz ............... D21H 23/32 |

FOREIGN PATENT DOCUMENTS

| | | |
|---|---|---|
| DE | 102015208102 A1 | 11/2016 |
| DE | 102016215025 A1 | 2/2018 |
| DE | 102018131992 A1 | 6/2020 |
| EP | 1121240 B1 | 3/2003 |

* cited by examiner

*Primary Examiner* — Michael N Orlando
*Assistant Examiner* — Joshel Rivera
(74) *Attorney, Agent, or Firm* — Thompson Coburn LLP

(57) ABSTRACT

A sheet metal processing cell applies web material to sheet metal. The web material is unwound from a roll that is rotatably supported by a mandrel. An applicator assembly includes a conveyor for the sheet metal, an unwind stand, and an applicator roller that receives and applies the web material to the sheet metal. An storage assembly disposed above the conveyor has mounts that support one or more mandrels. A transfer assembly includes a picker assembly that moves between the applicator assembly and the storage assembly and transfers the mandrel between the unwind stand and the mounts in the storage structure. The picker assembly has a roll clamp assembly configured to engage and disengage from the mandrel when the picker assembly transfers the mandrel to and from the unwind stand and when the picker assembly transfers the mandrel to and from the mounts in the storage structure.

29 Claims, 13 Drawing Sheets

SHEET METAL PROCESSING CELL FOR APPLYING WEB MATERIAL TO A SURFACE OF SHEET METAL AND METHOD THEREOF

TECHNICAL FIELD

The following disclosure is directed to a sheet metal processing cell for applying a web material to a surface of a sheet metal being processed in the sheet metal processing cell. The cell includes an applicator assembly for applying the web material to the sheet metal, a storage assembly for storing rolls of web material, and a transfer assembly for moving selected rolls of web material between the storage assembly and the applicator assembly.

BACKGROUND

Often when processing sheet metal, for instance, slitting master coils of flat rolled sheet metal material into multiple narrow coils or when cutting flat rolled sheet metal material to length into rectangular pieces, an adhesive backed web material or film, for instance, polyethylene or PVC, is applied to the top surface, and in some instances, the bottom surface of the sheet metal. This web material or film serves to protect the surface of the sheet metal from damage, scratches, scrapes, markings, dust, dirt, and contamination. The film may remain on the sheet metal as it passes through multiple other processes in the processing line and also processes used to manufacture a part. Often, these parts ultimately become part of an assembly such as a stove, a refrigerator, dishwasher, microwave oven, etc. When purchasing one of these items, this film is typically still on the assembly and is peeled off by the purchaser.

In other instances, for instance, when processing aluminum, instead of applying film, a paper may be used and may be attached to the sheet metal material with a static charge. A static generator may be used to create a temporary static charge that attracts the paper to the sheet metal material. Aluminum is prone to surface scratching, especially during the shipping process. On slit coils, the paper may be interwound between each wrap of the coil, which in turn prevents the opposing wraps from scratching one another in the event the material shifts due to vibrations and/or fretting, etc. Likewise, paper is also placed between each cut sheet for the same purpose. However, unlike the film, the paper is removed and discarded once the parts are destacked or uncoiled.

Depending on the application, the rolls of the web material, (polyethylene, PVC, paper, etc.) often have to be changed frequently, and often within the same coil during processing through a line, for instance, a cut-to-length and/or stacking line. Often the changeover is due to color preference, strength of the adhesive, customer's logo, etc. In conventional processing, the changeover of a roll of web material is done manually by one operator using a hoist/crane, and in some cases, without the assistance of any separate device. The previously used roll must be taken off of a shaft used to hold the roll in place on the applicator. Once it is removed, a new roll is place on the same shaft and placed on the applicator.

The processing lines used to slit or cut the coils to length are quite expensive, and significant efforts are made to keep the processing line running as much as possible. Conventional changeover of the rolls of web material is a time consuming, cumbersome, process. Past attempts to improve changeover of the rolls involve arranging two or more roll holders adjacent an applicator system. However, due to the size of the rolls, and their proximity to each other and the applicator system, the number of roll holders that can be arranged adjacent the applicator system is limited.

SUMMARY

As will become evident from the discussion that follows, a processing cell may be provided that includes an applicator assembly for applying the web material to the sheet metal, a storage assembly that can hold/store multiple rolls of web material for use in the applicator assembly, and a transfer assembly to move the rolls between the applicator assembly and the storage assembly. A control may be provided that stores in memory information about the rolls, for instance, the location of a particular roll in the storage assembly, a material characteristic of the web material comprising the roll, the size of the roll (width, diameter, caliper), the amount of web material used in the last process, a processing recipe or job using a particular roll of web material. Using the control, the selection, for instance, the order in which the rolls are required, can be preprogrammed in advance by the operator, and via the transfer assembly, rolls may be moved automatically on demand between the applicator assembly and the storage assembly depending upon the job, customer, sheet metal type, etc.

Once a selected roll of web material being applied to the sheet metal is depleted or simply needs to be changed, it may be automatically removed from the applicator assembly, moved to the storage assembly, and a new roll may be automatically retrieved from another location in the storage assembly and loaded in the applicator assembly. While the line is running, empty roll positions can be loaded with the transfer assembly.

As a result, down time of the line for roll changeover can be significantly reduced, and operator involvement in operating the line can be reduced.

In addition, via the control system, the amount of web material left on each roll may be automatically tracked, thereby allowing the system to alert the operator when the web material of a particular roll is close to being depleted.

Further advantages of the processing cell and its associated methods follows in the description below.

DETAILED DESCRIPTION

Figure 1:
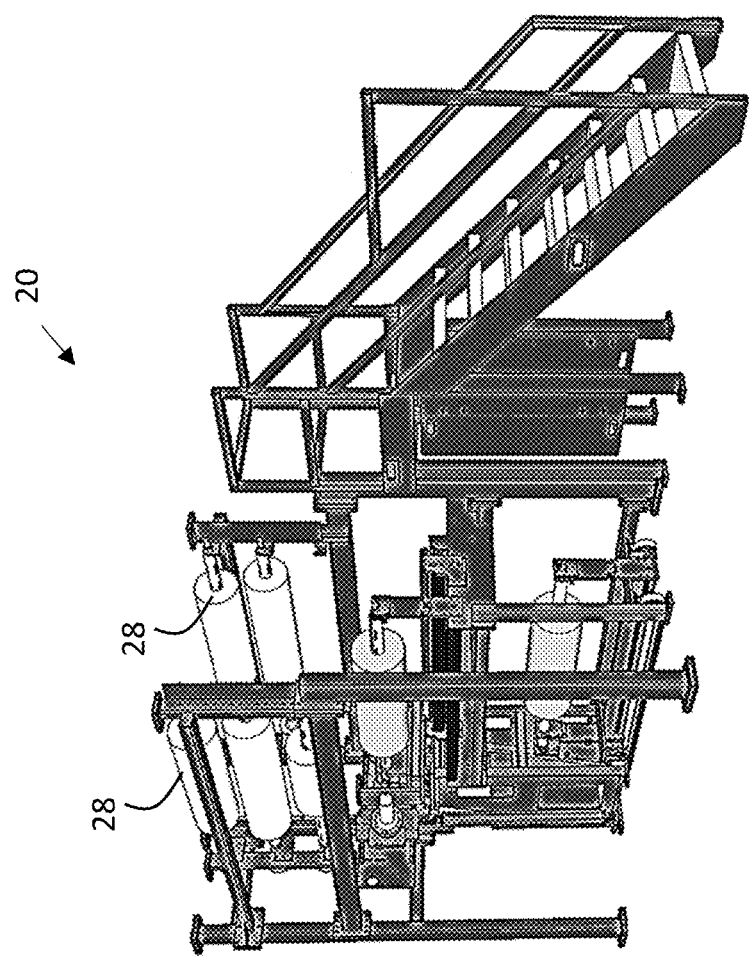
FIG. 1 is perspective view of an exemplary sheet metal processing cell for applying a web material to a surface of sheet metal.
Figure 2:
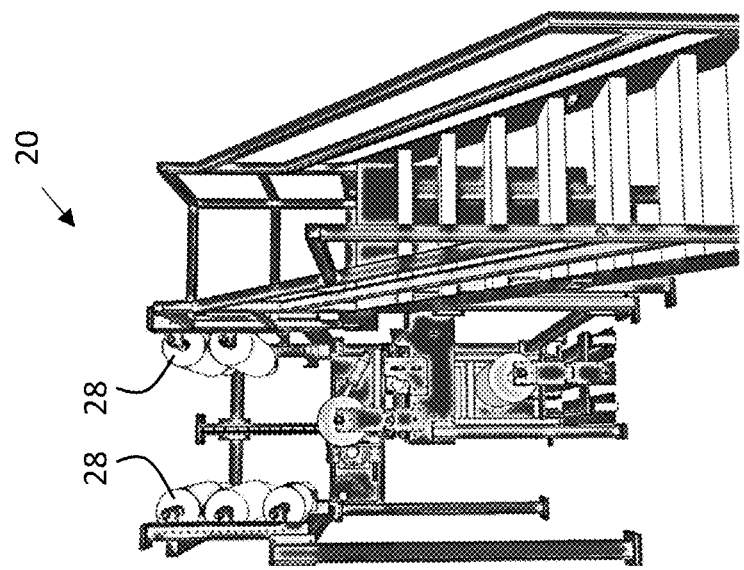
FIG. 2 is an alternative perspective view of the cell.
Figure 3:
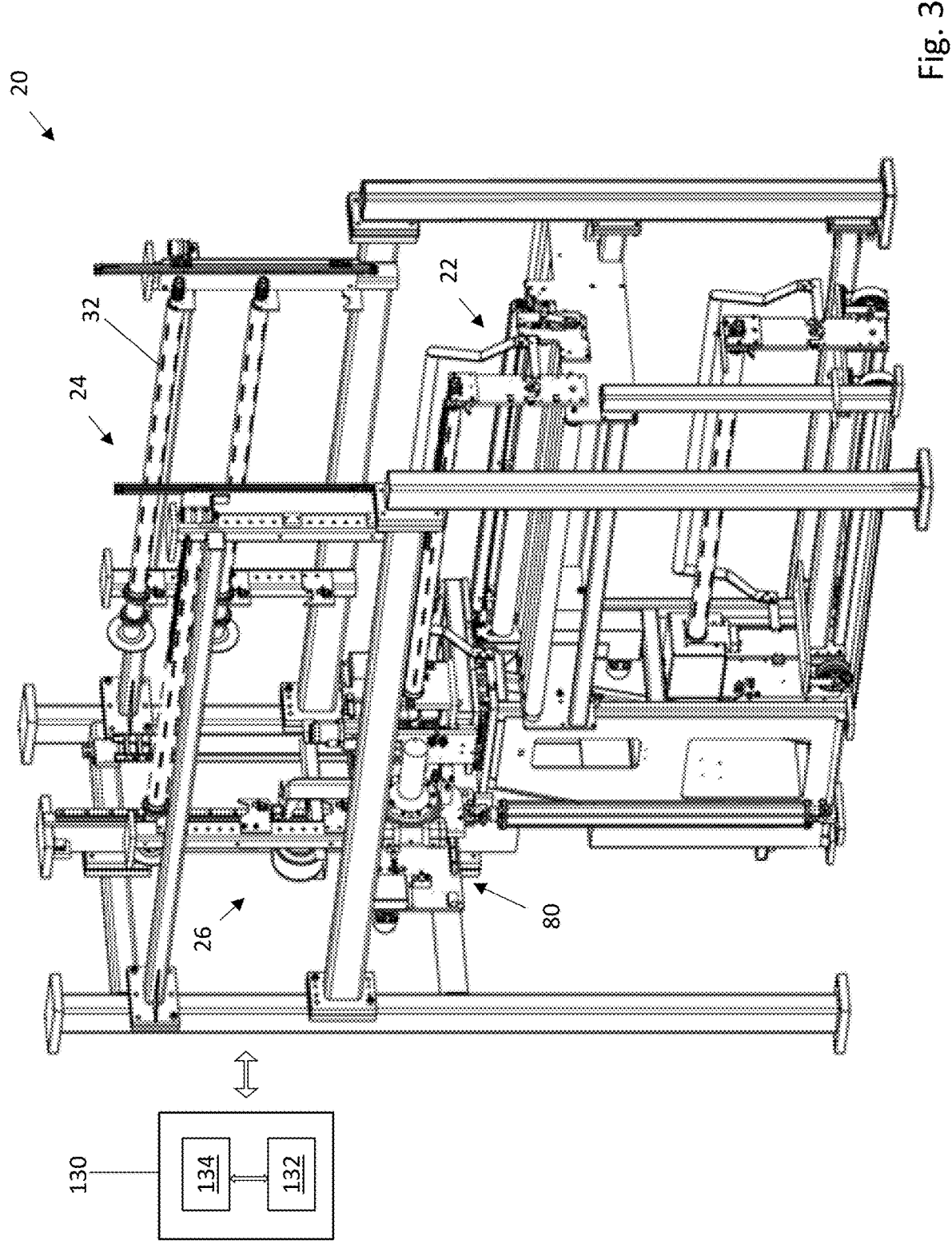
FIG. 3 is an alternative perspective view of the cell.
Figure 4:
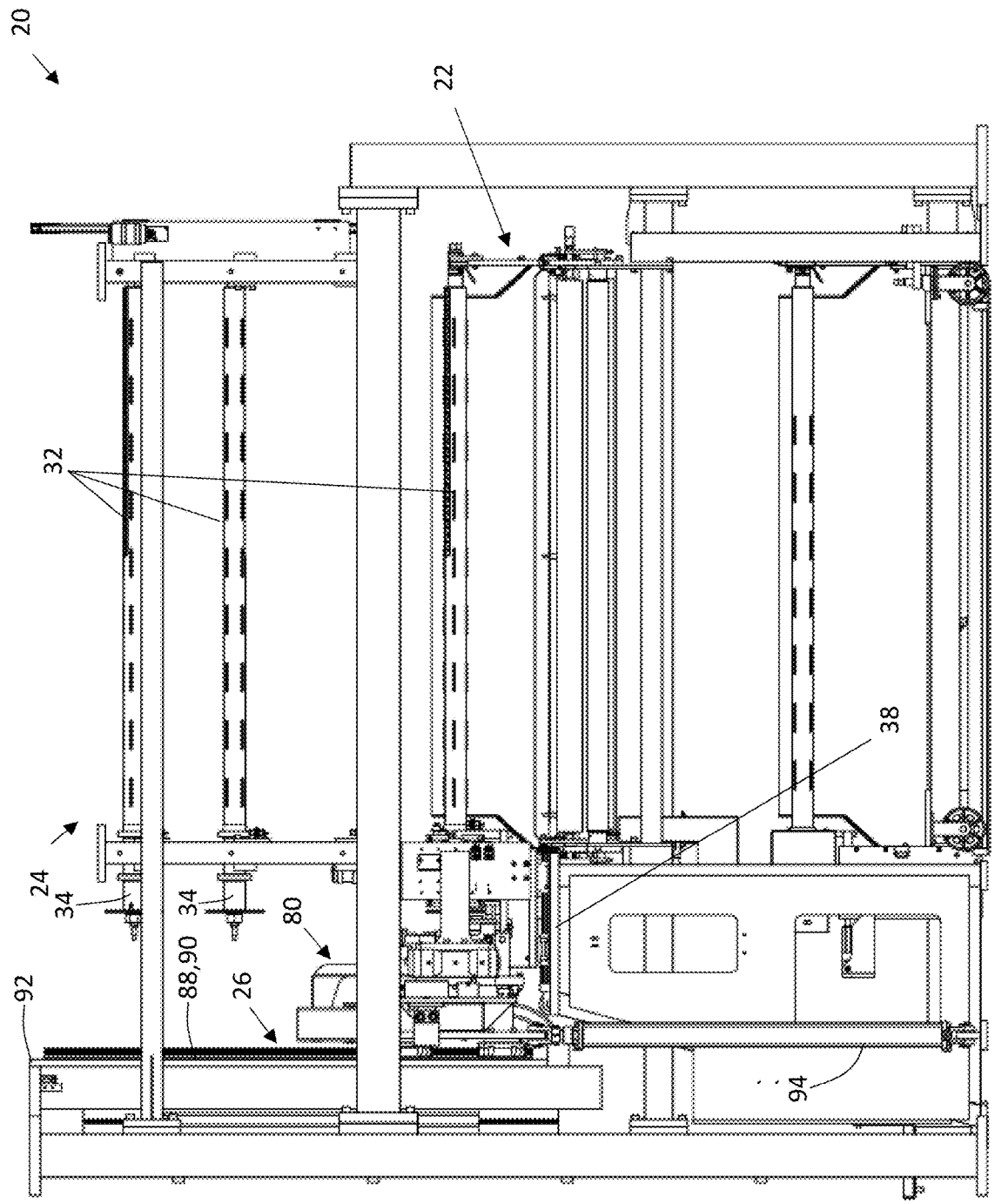
FIG. 4 is a side view of the cell.
Figure 5:
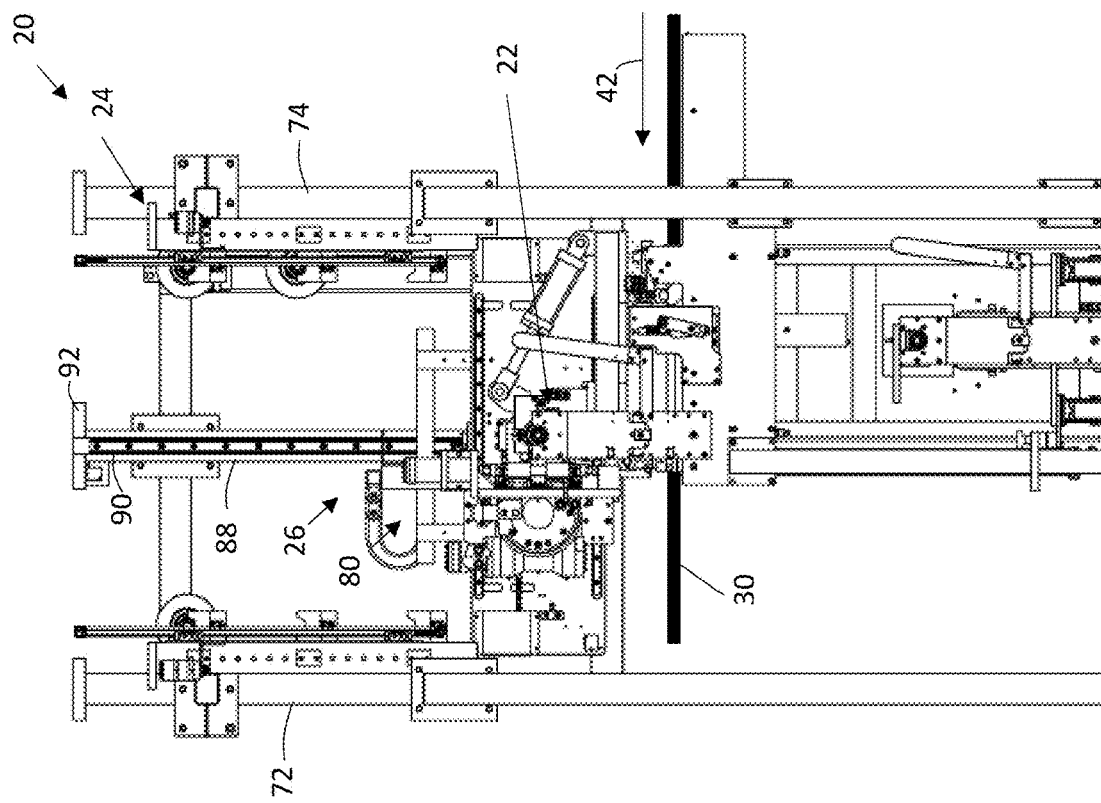
FIG. 5 is an operator side elevational view of the cell.
Figure 6:
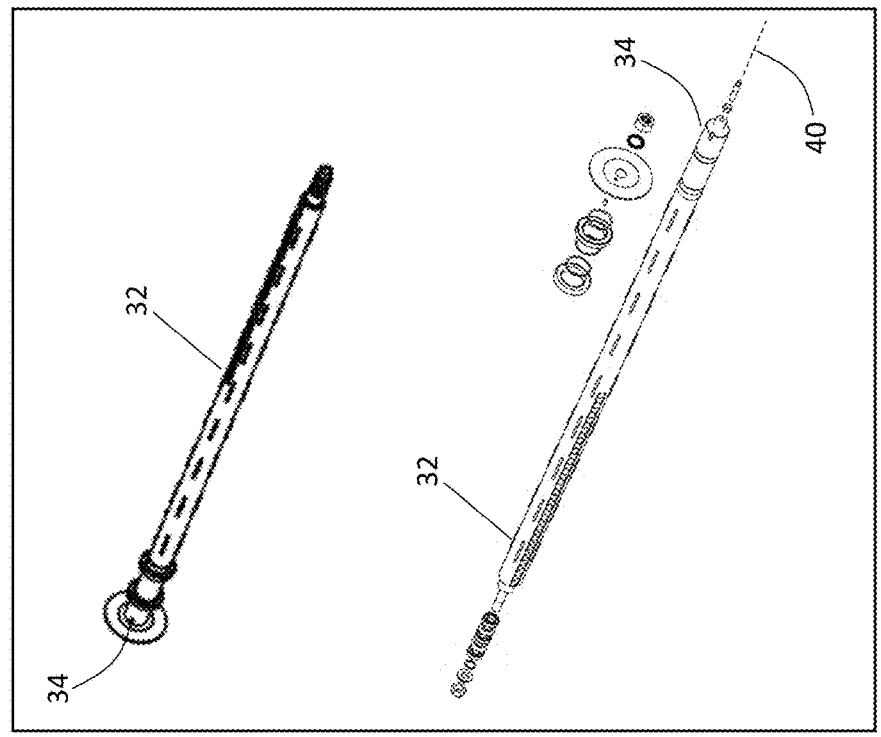
FIG. 6 is a perspective view of a mandrel used to rotatably support and interface a roll of web material with components in the cell.
Figure 7:
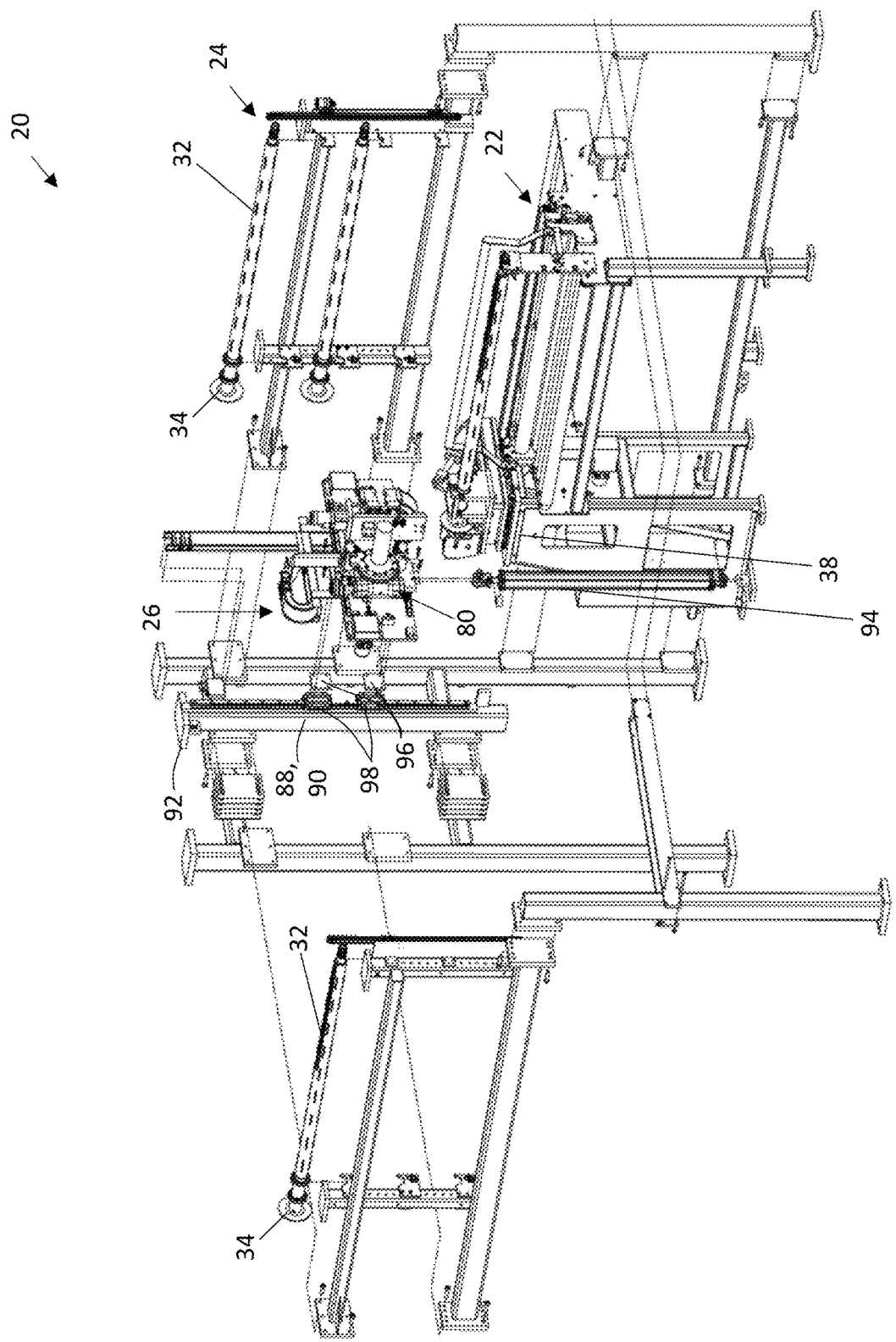
FIG. 7 is an exploded perspective view of the cell.

FIGS. 1-7 provide a basic layout of the exemplary cell 20 for applying a web material to a top surface of sheet metal. The cell 20 includes an applicator assembly 22, a storage assembly 24 and transfer assembly 26. Web material is stored on a convolutely wound roll 28 and the roll is moved between the storage assembly 24 and applicator assembly 22 via the transfer assembly 26. The web material is unwound from the convolutely wound roll 28 and applied to the sheet metal 30 in the applicator assembly. The roll 28 of web material is rotatably supported by a mandrel 32, for instance, as shown in FIG. 6. The mandrel 32 may be directed through the center of the roll 28 of web material. Alternatively, the roll of web material may be directly wound about the mandrel. As will be discussed in further detail below, the mandrel 32 provides an interface of the roll to the applicator assembly 22, transfer assembly 26, and storage assembly 24 of the cell 20. Accordingly, several mandrels may be provided and may be standardized for the cell, so each roll-mandrel pair provides flexibility in moving the roll-mandrel pair between each of applicator assembly, transfer assembly, and storage assembly of the cell. The mandrel 34 may include one or more end effectors 34 that are compatible with various equipment in the cell and allow for the mandrel to be transferred between machinery in the cell. The mandrel 28 may be provided with an inflatable air bladder that expands against the cores of the rolls to releasably secure the rolls to the mandrel. Pressurized air may be directed in to the inflatable bladder to install the mandrel with the roll. The air pressure may be relieved to release the mandrel from the roll to allow roll to be removed and a new/different roll to be loaded on the mandrel. The process of inflating/deflating the bladder may be manual or automatic. For instance, once the mandrel is assembled with the roll and the inflatable bladder expanded, the air pressure in the bladder may be maintained with valves, which may be quick connect check valves with manually relief capability. When in the storage assembly and/or in the applicator assembly, air pressure directed through airlines may be releasably coupled to the inflatable bladder of the mandrel, for instance, through the quick connected check valve. As such, as the mandrel-roll pair is moved between the storage assembly and the applicator assembly, air pressure may be connected/disconnected from the inflatable bladder of the mandrel to allow movement of the mandrel-roll pair as needed while releasably securing the roll to the mandrel.

Figure 8:
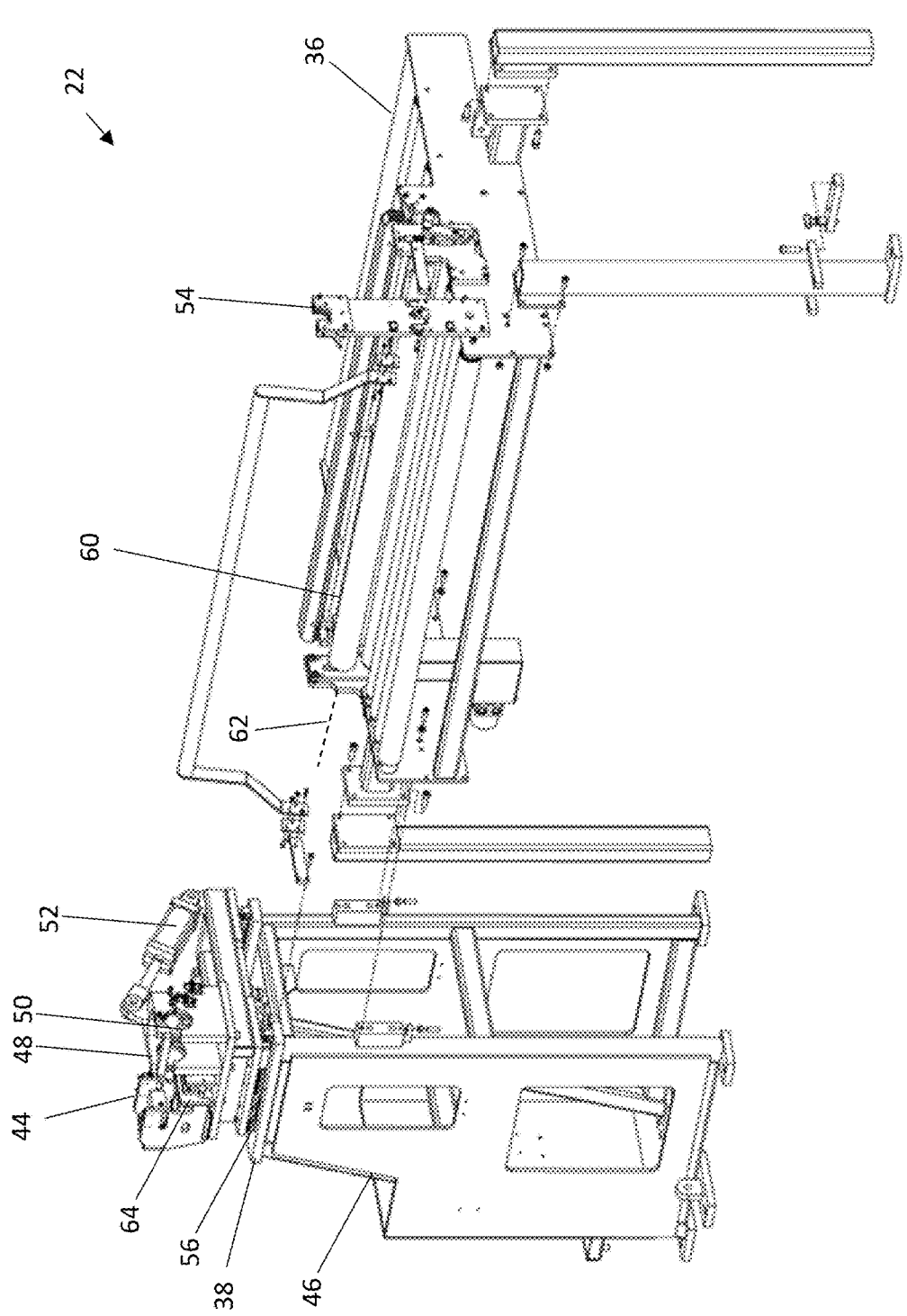
FIG. 8 is a perspective of an applicator assembly of the cell.
Figure 9:
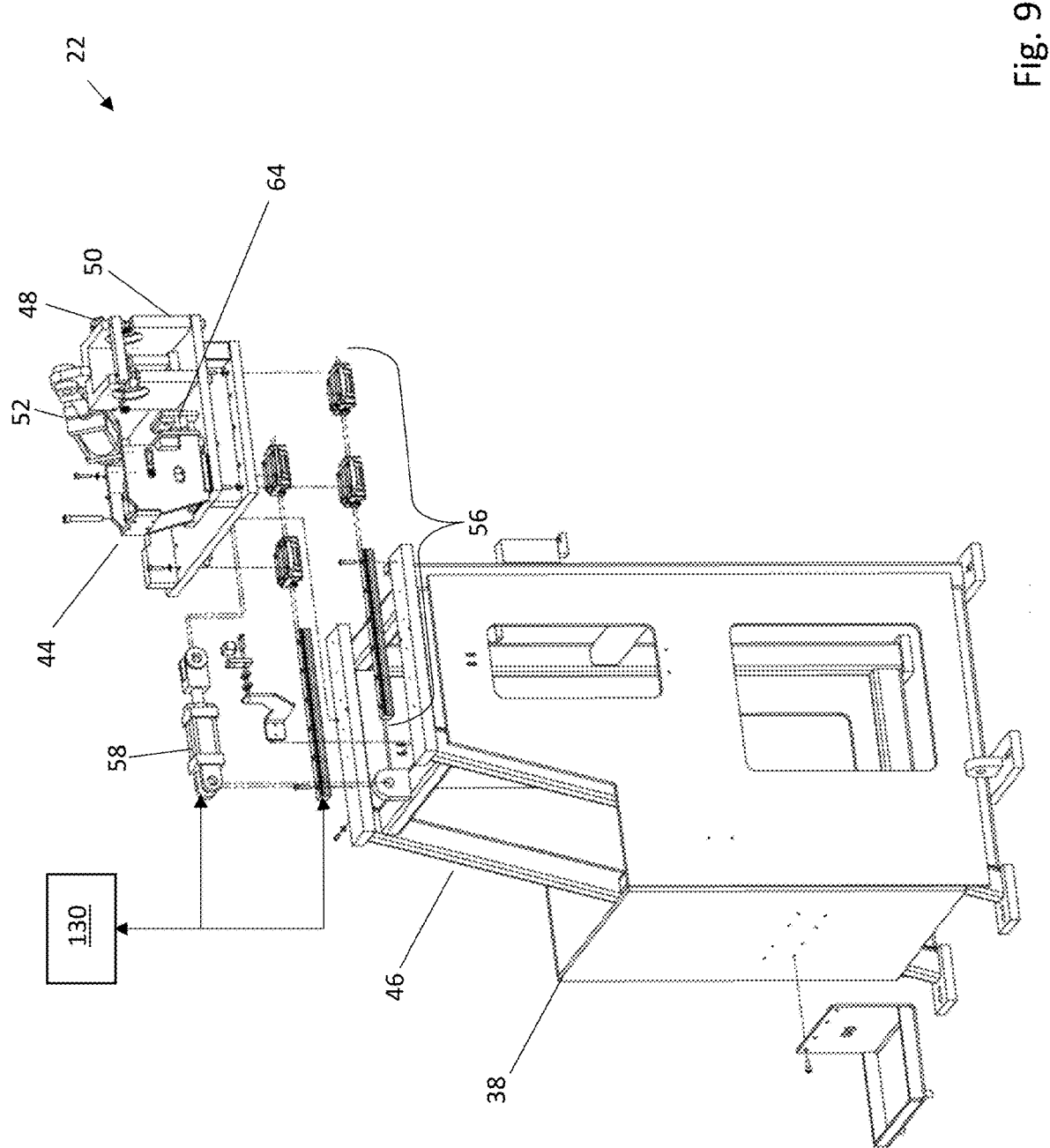
FIG. 9 is an exploded perspective of a portion of an unwind stand of the applicator assembly of the cell showing additional detail of a roll holder of the unwind stand.
Figure 10:
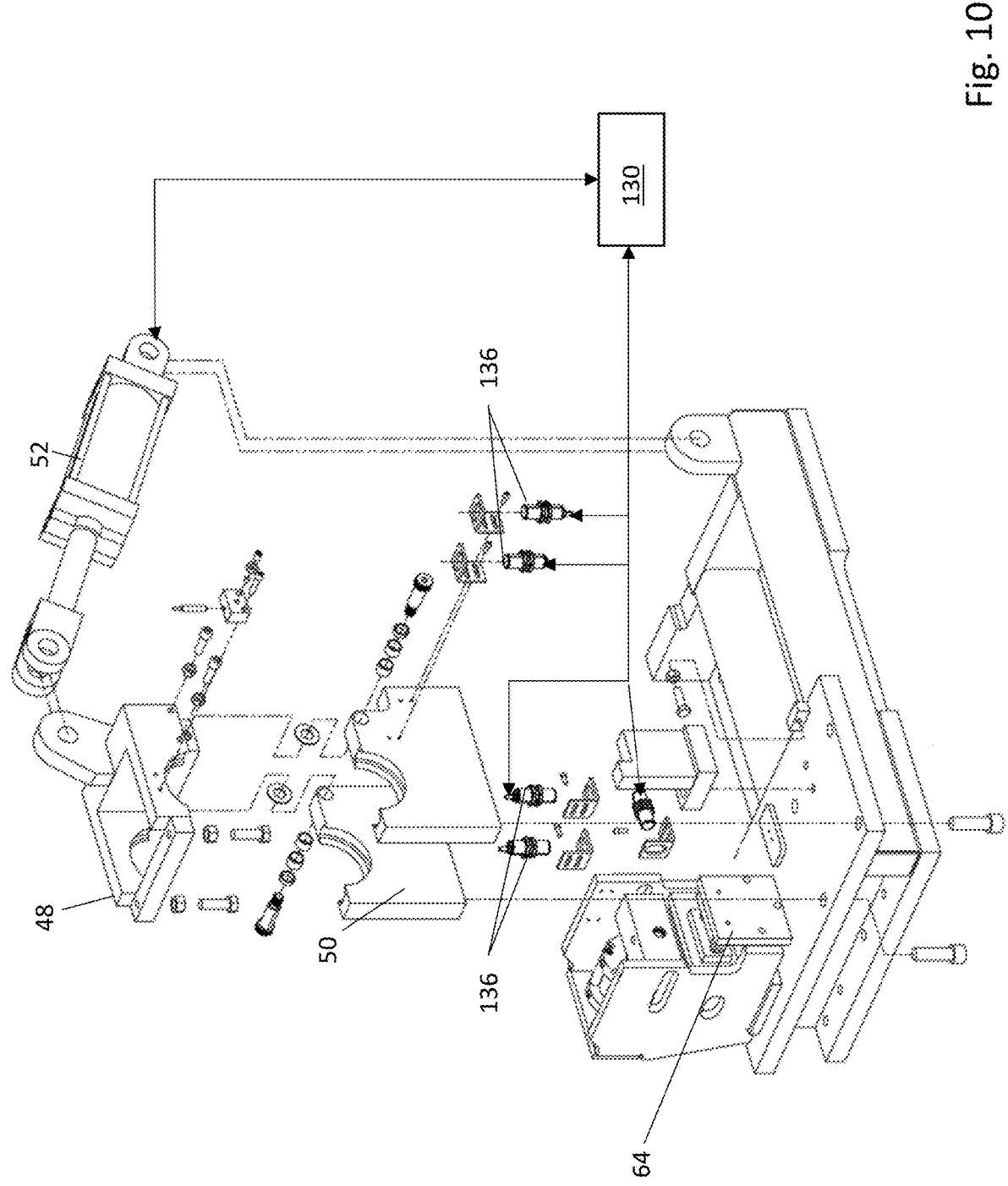
FIG. 10 is an exploded perspective view of the roll holder of the unwind stand.

Making reference to FIGS. 8-10, the cell includes the applicator assembly 22. The applicator assembly further includes a conveyor 36 on which the sheet metal moves through the processing cell in a direction of advancement. The conveyor 36 may be a roller conveyor and/or a belt conveyor. The conveyor 36 may include a traction roller for engaging the sheet metal and moving it in the direction of advancement to the next processing cell, for instance, a shear cell for cutting the sheet metal to length. The conveyor may be passive and rely upon other equipment in the processing line to move the sheet metal in the direction of advancement.

The applicator assembly may also include an unwind stand 38 adjacent to the conveyor 36. The unwind stand 38 may be configured to receive the mandrel 32 and rotatably support the mandrel and the roll while the web material is unwound and applied to the surface of the sheet metal 30. As shown in the drawings, the unwind stand 38 is configured to support the mandrel 32 above the conveyor 36 in a manner such that a center axis 40 of the mandrel 32 is transverse to a direction of advancement 42 of the sheet metal in the cell. The unwind stand may support the mandrel in other configurations and orientations relative to the direction of advancement, and formers or rotation bars/rollers may be used to turn and direct the unwound web to the surface of the sheet metal. The unwind stand 38 may include a roll holder 44 on a support structure 46 that engage sand rotatably supports the mandrel 32. The roll holder 44 may include upper and lower jaws 48,50 that engage an end of the mandrel, for instance, the end effector of the mandrel. The top jaw 48 may move relative to the bottom jaw 50 to allow the roll holder to engage and disengage from the mandrel end effector 34. The top jaw 48 may be moved relative to the bottom jaw with an actuator 52 to allow the roll holder to engage and disengage from the mandrel end effector. The unwind stand 38 may also include a tail stock piece 54 to engage and rotatably support an end of the mandrel 32 opposite the end effector 34. As shown in the drawings, the roll holder 38 and support structure 46 are provided on one lateral side of the conveyor 36 and the tail stock 54 is provided on the opposite lateral side of the conveyor. To enable lateral alignment of the web material with the sheet metal 30, a lateral slide assembly 56 may be provided between the support structure 46 and the roll holder 38 to allow the roll holder to move toward and away from the conveyor 36 on and relative to the support structure with a lateral slide actuator 58.

The applicator assembly 22 may further include an applicator roller 60 that is adjustably spaced from the conveyor as desired depending upon the thickness of the sheet metal and caliper of the web material. The applicator roller 60 is configured to receive the web material from the roll 28 of wound web material and apply the web material to the sheet metal 30 being conveyed on the conveyor 36. The applicator roller 60 may press the web material onto the surface of the sheet metal 30. The applicator roller 60 may have a center axis 62 that extends transverse to the direction of advancement 42 of the sheet metal 30. The leading edge of the web material may be threaded manually or automatically from the roll 28 of web material around the applicator roller 60 onto the surface of the sheet metal. The motion of the sheet metal 30 moving on the conveyor 36 in the direction of advancement 42 with the applicator roller 60 rotating and applying the web material to the surface of the sheet metal is sufficient to cause the roll of web 28 material to rotate, unwind in the unwind stand 38 and deliver web material to the applicator roller. Alternatively, the roll holder may be provided with a motor and drive for rotating the mandrel and unwinding the web at a speed corresponding to the speed of advancement of the sheet metal across the conveyor. In order to apply the web material via the applicator roll smoothly and void of any wrinkles, bubbles, etc., it may be necessary to apply a back tension to the roll. Accordingly, the unwind stand may be provided with a brake 64. The brake 64 may operatively engage the end effector 34 of the mandrel 32 of the roll when loaded into the roll holder 44. The engagement and level of engagement (i.e., braking force) may be automatically applied to the mandrel 28 based upon the rate of advancement of the sheet metal through the applicator assembly and the angular velocity of the roll. The unwind stand 38 may also be provided with a perforating mechanism (not shown) to cut the web along a trailing edge that can be separated from the web applied to the sheet metal.

Figure 11:
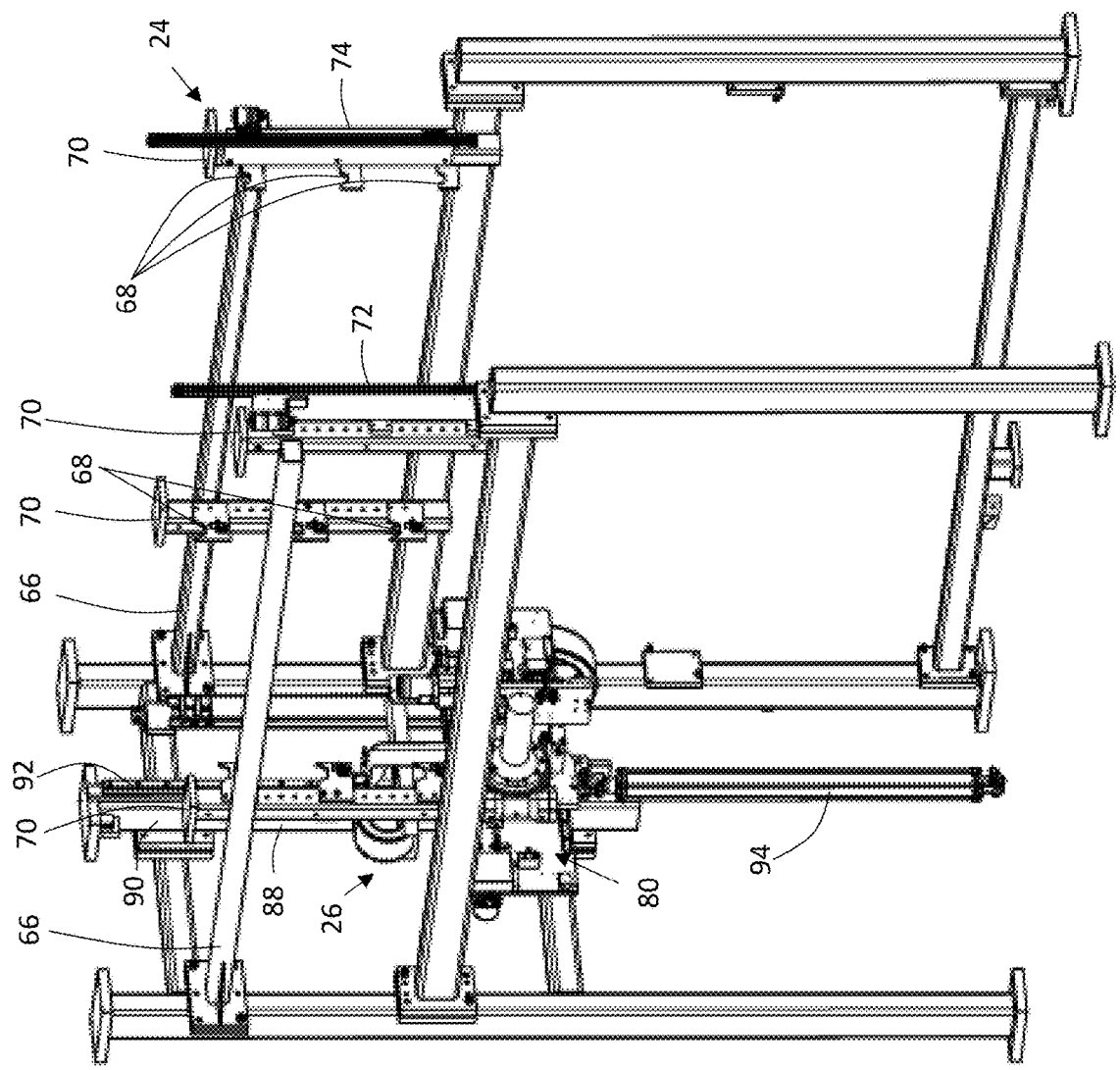
FIG. 11 is a perspective view of a transfer assembly and storage assembly of the cell with the applicator assembly removed for ease of illustration.
Figure 12:
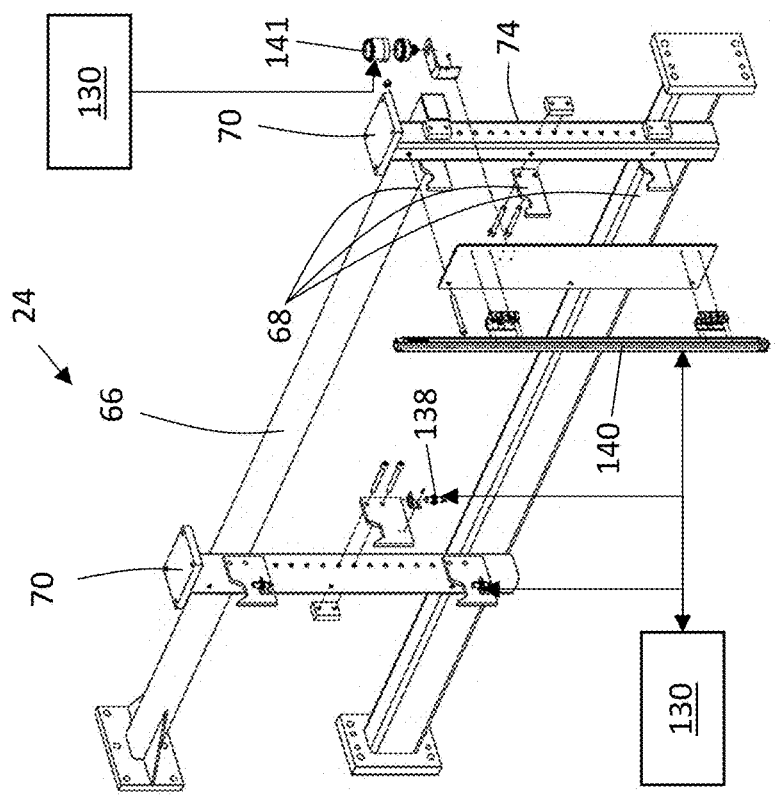
FIG. 12 is an exploded perspective view of a portion of the storage assembly.
Figure 13:
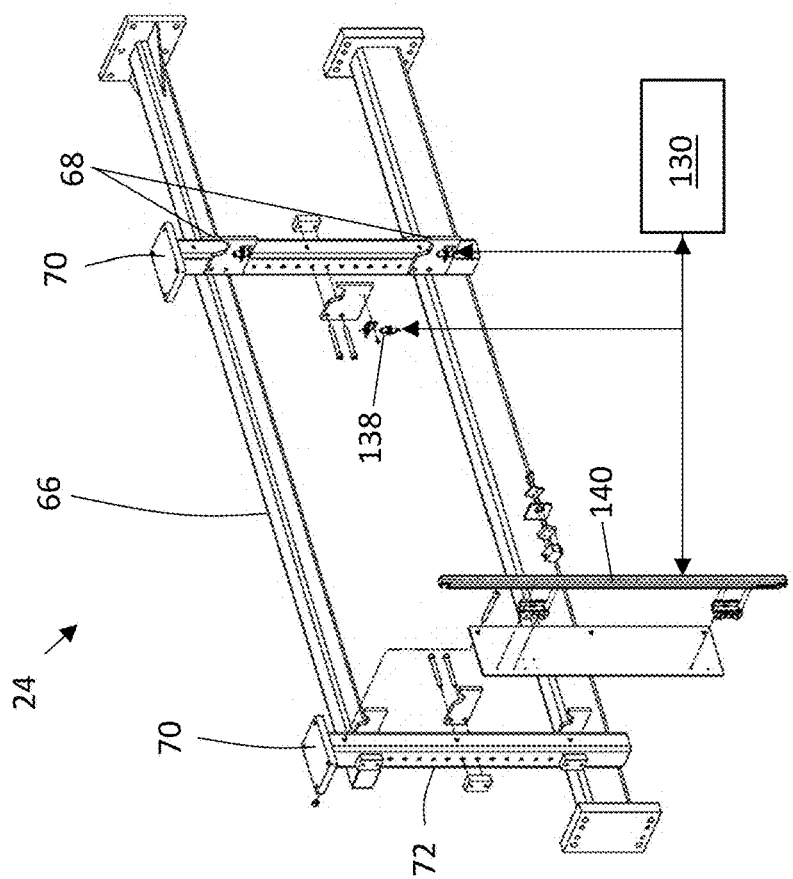
FIG. 13 is an exploded perspective view of another portion of the storage assembly.
Figure 14:
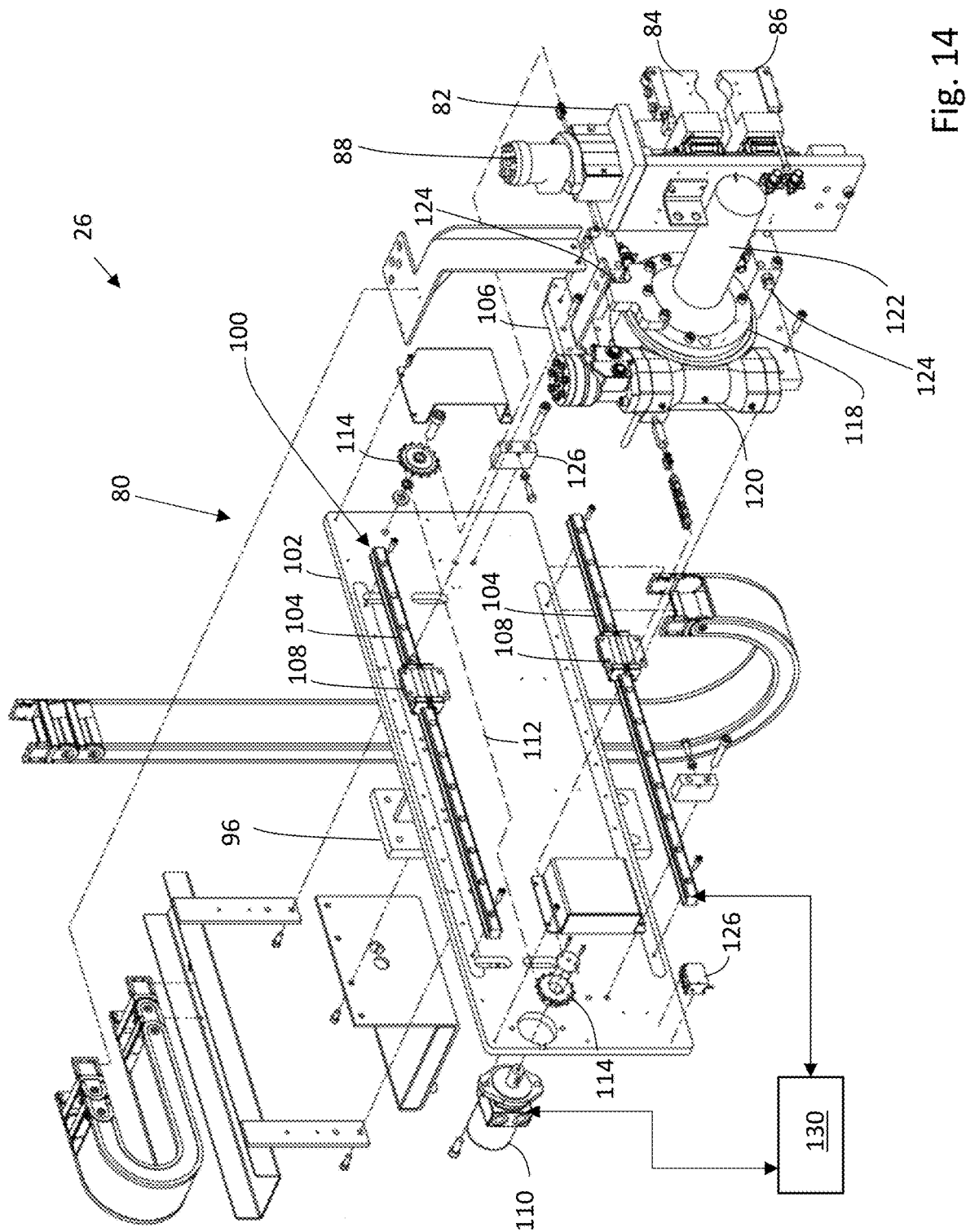
FIG. 14 is an exploded perspective view of the transfer assembly.
Figure 15:
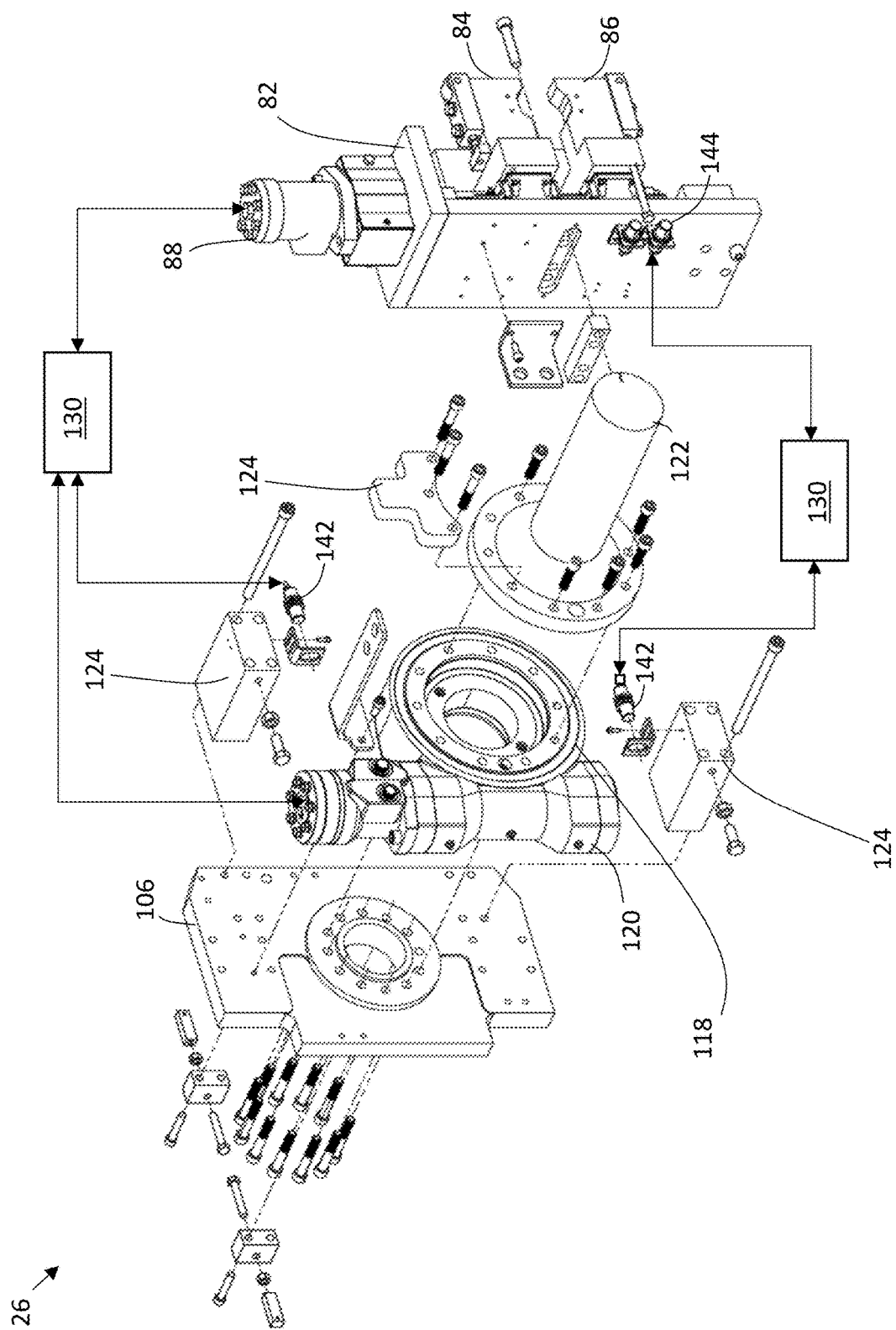
FIG. 15 is an exploded perspective view of a roll clamp, slew drive and sub-plate of a picker assembly of the transfer assembly.
Figure 16:
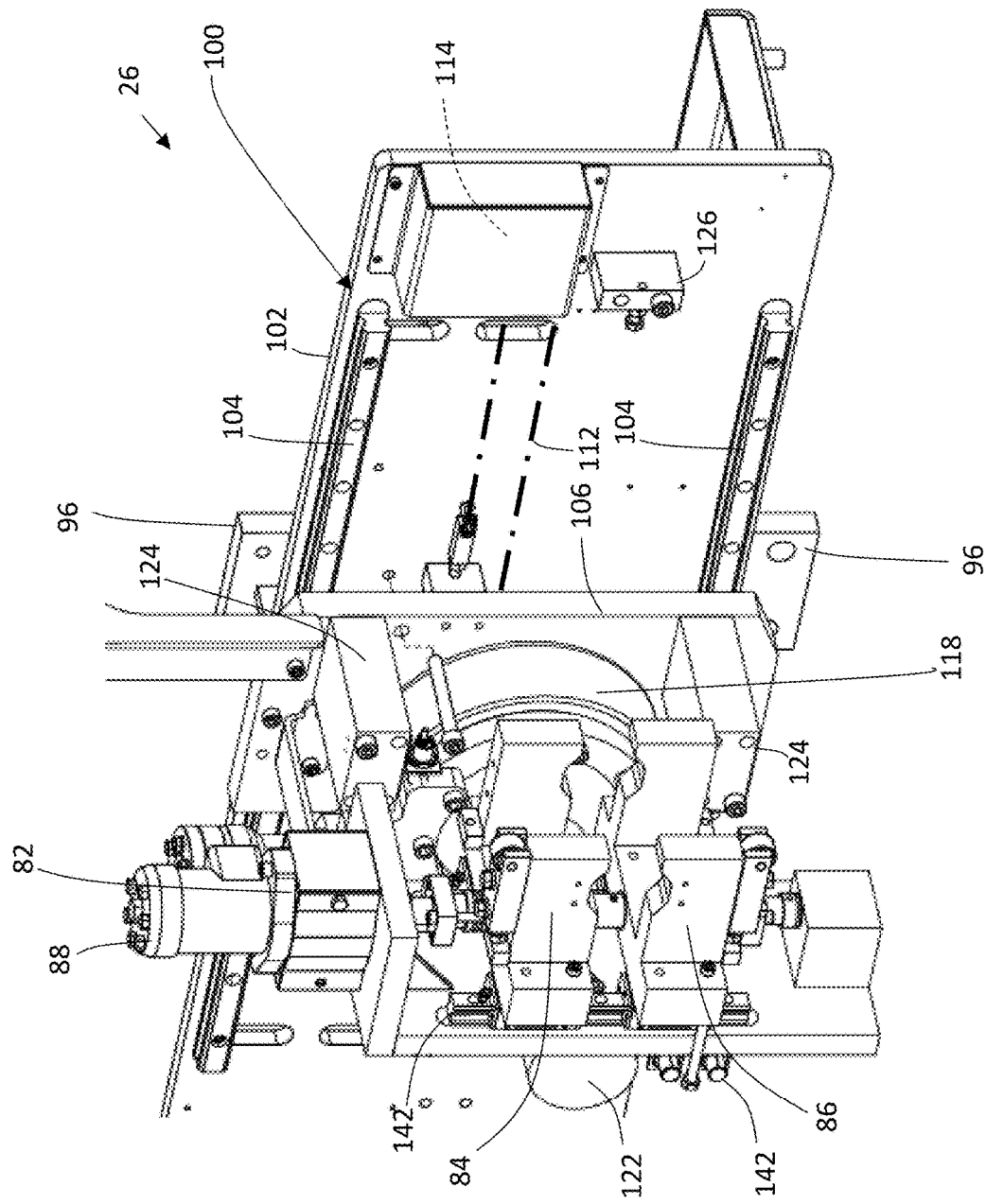
FIG. 16 is an alternative perspective view of a roll clamp, slew drive and sub-plate of a picker assembly of the transfer assembly.

FIGS. 11-13 show additional detail of the storage assembly 24. The storage assembly 24 may comprise a storage structure 66 that may be disposed above the applicator assembly 22 and above the conveyor 36. The storage structure 66 may include a plurality mounts 68 that are adapted and configured to support the mandrel 32. In one aspect, the storage structure 66 comprises a plurality of racks 70 where each rack has the mounts 68 that engage with the mandrel 32 and support the roll-mandrel pair in the storage structure 66. The roll-mandrel pairs may be stored in the racks vertically relative to each other and/or also horizontally relative to each other. The storage structure 66 may be arranged so each rack 70 and mount 68 supports the roll-mandrel pair in a direction that is transverse to the direction of advancement 42, and/or which may be above and/or over the conveyor 36. Accordingly, the rolls 28 may be arranged on the mandrels in the storage structure 66 with the center axes 40 of the mandrels 32 in a series of horizontal and vertical parallel planes. While the drawings show a storage structure 66 comprising a 2 by 3 array (that is, left and right storage structure portions 72,74 with three vertical positions in each of the left and right storage structure portions), other arrangements may be provided, for instance, a 1 by 3 array with a single storage structure portion with three vertical positions. Providing the mounts 68 and racks 70 above and over the conveyor 36 so as to store the roll-mandrel pair in a horizontal configuration provides a more compact footprint for the cell, although depending on the plant layout and the configuration of the transfer assembly, the racks may be positioned in other orientations relative to the conveyor, applicator assembly, and transfer assembly.

Making reference to FIGS. 10 and 14-16, the cell may include the transfer assembly 26 for moving the roll-mandrel pairs between the storage assembly 24 and the applicator assembly 22. The transfer assembly 26 comprises a picker assembly 80. The picker assembly 80 is configured to move between the applicator assembly 22 and the storage assembly 24, and transfer the mandrel 32 between the unwind stand 38 and selected locations in the storage structure 66. The picker assembly 80 has a roll clamp assembly 82 that is configured to engage and disengage from the mandrel 32, for instance, the mandrel end effector 34, when the picker assembly transfers the mandrel to and from the unwind stand and when the picker assembly transfers the mandrel to the mounts 68 associated with a selected location in the storage structure. The roll clamp assembly 82 may comprise upper and lower jaws 84,86 that engage and disengage from the mandrel 32. One or both of the jaws may move to allow the roll clamp assembly 82 to engage and disengage from the mandrel, for instance, the end effector of the mandrel. An actuator 88 may be provided to move one or both of the jaws 84,86 to allow the roll clamp assembly 82 to engage and disengage from the mandrel 32.

The jaws 84,86 of the roll clamp assembly 82 may be configured to cooperate with the jaws 48,50 of the roll holder 44 of the unwind stand 38 to allow the transfer of the mandrel 32 between the picker assembly 80 and the unwind stand. For instance, the roll clamp assembly 32 may have two spaced-apart upper jaws 84 and two spaced-part lower jaws 86, and the roll holder 44 may have two spaced-apart top jaws 48 and two spaced-apart bottom jaws 50. In the roll clamp assembly 82, the distance of the spaced apart jaws 84,86 may be sufficiently large to enable the roll clamp assembly to support the roll-mandrel pair in a cantilevered orientation during movement of the roll-mandrel between the storage assembly 24 and the applicator assembly 22. However, the distance of the spaced apart jaws 84,86 of the roll clamp assembly 82 may be sufficiently small to allow the jaws 84,86 of the roll clamp assembly to nest within the spacing of the spaced apart jaws 48,50 of the roll holder 44 so the picker assembly can move the jaws 84,86 of the roll clamp assembly 82 into register with the jaws 48,50 of the roll holder 44 and allow both the jaws 84,86 of the roll clamp assembly 82 and the jaws 48,50 of the roll holder 44 to move as needed to engage and disengage from the end effector 34 of the mandrel 32 and allow transfer of the roll-mandrel pair between the roll clamp assembly and the roll holder. Accordingly, the end effector 34 of the mandrel 32 may be sized to allow simultaneous engagement by both sets of jaws 48,50, 84,86 of the roll clamp assembly and roll holder. The nesting arrangement may also be reversed so the jaws of the roll holder nest within the jaws of the roll clamp assembly.

The transfer assembly 26 may include a first slide assembly 88 that is configured to move the picker assembly 80 in a first direction relative to the direction of advancement 42 as the picker assembly moves between the applicator assembly 22 and the storage assembly 24. For instance, the first slide assembly 88 may include linear guideway rails 90 on a vertical support structure 92 of the frame of the cell. As shown in the drawings, the vertical support structure 92 and linear guideway rails 90 extend from a position generally slightly below the unwind stand 38 to the topmost region of the storage assembly 24. Further, the vertical support structure 92 and linear guideway rails 90 are generally centered between the left storage structure portion 72 and the right storage structure portion 74. The first slide assembly 90 may further include a linear actuator 94 for moving the picker assembly 80 vertically upward and downward relative to the vertical support structure 92 on the linear guideway rails 90. The picker assembly 80 may include one or more a linear guideway block mounting plates 96 that interface the picker assembly to the first slide assembly 88. Linear guideway blocks 98 that slidingly engage the linear guideway rails 92 may be mounted to the linear guideway block mounting plates 96.

The transfer assembly 26 may also include a second slide assembly 100 that is configured to move the picker assembly 80 in a second direction relative to the direction of advancement 42 as the picker assembly moves between the applicator assembly 22 and the storage assembly 24. For instance, the second slide assembly 100 may be configured to move the picker assembly 80 in a direction parallel to the direction of advancement and thus a direction that is perpendicular to the first slide assembly. The picker assembly 80 may include a lateral support structure 102 and the second slide assembly 100 may be mounted to the lateral support structure. The lateral support structure 102 may be mounted to the linear guideway block mounting plates 96 and/or may be formed integrally or monolithically with the linear guideway block mounting plate(s). The lateral support structure 102 may include two spaced apart horizontally orientation linear guideway rails 104. The picker assembly may further include a sub-plate 106. The sub-plate 106 is configured to translate on the second slide assembly 100 relative to the lateral support structure 102. For instance, the sub-plate 106 may include linear guideway blocks 108 that slidingly engage the linear guideway rails 104 of the second slide assembly 100, so the sub-plate 106 may move in the direction parallel to the direction of advancement 42 relative to the lateral support structure 102. The roll clamp assembly 82 may be operatively mounted to the sub-plate 106 so the roll clamp assembly with the sub-plate may move in the direction parallel to the direction of advancement 42 relative to the lateral support structure 102. The picker assembly 80 may further includes a drive motor 110 operatively connected to a drive system that allows the sub-plate 106 and roll clamp assembly 82 to move relative to the lateral support structure 102. The drive system may include an endless loop 112 and a plurality of pulleys or sprockets 114 engageable with the endless loop. The endless loop 112 may extend across the lateral support structure 102 and may be driven with the drive motor 110. The sub-plate 106 may be mounted to the endless loop 112 in a manner such that operation of the motor 110 (clockwise rotation or counterclockwise rotation) enables the sub-plate 106 to translate forwards and backwards (left and right in the drawings) on the second slide assembly 100 via the endless loop.

The picker assembly may further include a pivot mechanism 118. The pivot mechanism 118 may be mounted to the sub-plate 106. The pivot mechanism 118 is configured to rotate the roll clamp assembly 82 relative to the sub-plate 106. The pivot mechanism 118 may comprise a slew drive 120 and pivot shaft 122 for rotating the roll clamp assembly 82 relative to the sub-plate 106. As shown in the drawings, the roll clamp assembly 82 is offset to one side of the picker assembly 80 and positioned on one side of the pivot shaft 122 (i.e., the right side in the drawings) so the roll clamp assembly 82 may interface with the roll holder 44 of the unwind stand 38 by moving laterally toward and away from the roll holder in one plane of motion without interfering with the actuator 52 of the roll holder and other equipment and structure of the application assembly 22. In this position, the roll clamp assembly 82 is also able to engage roll-mandrel pairs in the right storage structure portion 74 as the picker assembly moves on the first and second slide assemblies 88, 100 adjacent the mounts 68 and the racks 70 in the right storage structure portion 74. To provide a full range of motion of the picker assembly 80, especially when the picker assembly is in storage assembly 24, the pivot mechanism 118 allows for rotation of the roll clamp assembly 82 about the pivot shaft 122 from one side of the pivot shaft to the diametrical opposite side of the pivot shaft. In this position, the roll clamp assembly 82 is able to engage roll-mandrel pairs in the left storage structure portion 72. The pivot mechanism 118 dispenses with the need to provide a larger length lateral support structure 102 and second slide assembly 100. Depending upon the configuration of the storage assembly 24 and storage structure 66, the pivot mechanism may be eliminated. The pivot mechanism may include positive stops 124 to limit motion of the roll clamp assembly between positions about the pivot shaft. The second slide assembly 100 may also include positive stops 126 to limit motion of the sub-plate 106 on the lateral support structure 102.

Operation of the cell 20 may be controlled by a control 130 that receives and transmits signals to and from various sensors, drives and actuators associated with the applicator assembly 22, the storage assembly 24, and the transfer assembly 26. The control 130 may have a memory 132 and processor 134 where the processor is adapted to store in the memory data and instructions for operating functions of the cell. Part or all of the functions or operations of the above mentioned equipment in the cell 20 may be controlled by the control 130 with the functions and operations executed by software processing (e.g., coding, algorithms, etc.). The software may be recorded in the memory 132, which may be a non-transitory computer-readable recording medium, such as one or more ROMs, RAMs, optical disks, hard disk drives, solid-state memory, servers, cloud storage, and so on and so forth, having stored thereon executable instructions which can be executed to carry out the desired processing functions and/or operations. For example, when the software is executed by the processor 134, the software causes the processor and/or a peripheral device to execute a specific function within the software. The system/method/device of the present disclosure may include (i) one or more non-transitory computer-readable recording mediums that store the software, (ii) one or more processors (e.g., for executing the software or for providing other functionality), and (iii) a necessary hardware device (e.g., a hardware interface). The control may further include a programmable logic control, one or more electronic circuitries including a semiconductor device, a semiconductor integrated circuit (IC) (e.g., such as a processor, CPU, GPU, ASIC etc.), or a large-scale integration (LSI). The LSI or IC may be integrated into one chip and may be constituted through combination of two or more chips. For example, the functional blocks other than a storage element may be integrated into one chip. The integrated circuitry that is called LSI or IC in the present disclosure is also called differently depending on the degree of integrations, and may be called a system LSI, VLSI (very large-scale integration), or ULSI (ultra large-scale integration). For an identical purpose, it is possible to use an FPGA (field programmable gate array) that is programmed after manufacture of the LSI, or a reconfigurable logic device that allows for reconfiguration of connections inside the LSI or setup of circuitry blocks inside the LSI. Any database/recording medium/storage medium or the like can be embodied as one or more of ROMs, RAMs, optical disks, hard disk drives, other solid-state memory, servers, cloud storage, used in isolation or in combination, and so on and so forth.

In connection therewith, the control 130 may be configured to send signals to the unwind stand 38 to actuate the roll holder jaw actuator 52 for engagement with and disengagement from a mandrel and to actuate the lateral slide actuator 58 for alignment of the unwind stand and web with the sheet metal on the conveyor. The lateral slide assembly 56 may provide signals to the control 130 indicating the position of the guideway blocks on the guideway rails of the lateral slide assembly. Position sensors 136 associated with the roll holder jaws 48,50 may provide signals to the control 130 indicating the position of the jaws as being in the engaged or disengaged position.

Additionally, the storage structure 66 may be provided with sensors 138 to sense the presence of a roll/mandrel in a specific location within the storage assembly 26. In connection therewith the control 130 may store in the memory 132 data associated with one or more roll-mandrel pairs including the location of such roll-mandrel pair within the storage assembly 26. The data associated with one or more roll-mandrel pairs may be representative of at least one the following: a diameter of the roll, a width of the roll, a caliper of the web of the roll, an amount of web material unwound from the roll during last use of the roll, a location of the roll in the storage structure, a material characteristic of the web material; and a processing job associated with the roll. A transceiver 140 in the storage structure 66 may sense RFID information associated with the mandrel 32 and roll 28 so as to allow updating of data associated with a roll after processing of a job with the roll of web material. The update of information may include data representative of any of the following: a diameter of the selected roll, a width of the selected roll; a caliper of the web material of the selected roll; an amount of web material unwound from the selected roll during last use of the roll; a location of the selected roll in the storage structure; and a material characteristic of the web material of the selected roll. A diameter sensor 141 may be arranged to sense the diameter of the roll. The diameter sensor 141 may use laser time of flight technology to calculate the distance from the sensor 141 to the roll 28 of web material in the unwind stand 38, thereby effectively measuring the radius of the roll, and after successive revolutions, measuring the difference in radius of the roll to estimate web caliper.

The control 130 may be configured to control multiple functions on the transfer assembly 26. For instance, the control 130 may be enabled to actuate the linear actuator 94 of the first slide assembly 88 to set the position of the picker assembly 80. The first slide assembly 88 may provide signals to the control 130 indicating the position of the guideway blocks 98 on the guideway rails 92. The control may be configured to send signals to the motor drive 110 of the second slide assembly 100 to control the position of the sub-plate 106 on the lateral support structure 102. The second slide assembly 100 may provide signals to the control 130 indicating the position of the guideway blocks 108 on the guideway rails 104. The control 130 may be configured to operate the slew drive 120 to rotate the roll clamp assembly about the pivot shaft. Position sensors 142 associated with the pivot mechanism (for instance, located on/adjacent to the positive stops 124) may provide signals to the control 130 indicating the position of the roll clamp assembly relative to the pivot shaft 122. The control 130 may be configured to operate the jaws 84,86 of the roll clamp assembly 82 to engage with and disengage from the mandrel end effector. Position sensors 144 associated with the roll clamp assembly jaws 84,86 may provide signals to the control 130 indicating the position of the jaws as being in the engaged or disengaged position.

The control 130 may be configured to enable any one of the following functions: (a) moving the picker assembly 80 on the first and second slide assemblies 88, 100 into the storage assembly 24; (b) moving the picker assembly adjacent a selected roll in the storage assembly; (c) with a roll clamp assembly 82 of the picker assembly, engaging an end effector 34 of the mandrel 32 of the selected roll; (d) moving the picker assembly with the selected roll on the first and second slide assemblies from the storage assembly to the unwind stand 38 of the applicator assembly 22; (e) placing the selected roll in the unwind stand with the picker assembly; (f) securing the selected roll in the unwind stand by engaging the end effector of the mandrel of the selected roll with the roll holder 44 of the unwind stand and disengaging the end effector of the mandrel of the selected roll from the roll clamp assembly 38; (g) once the leading edge of the web material is threaded from the selected roll about the applicator roller 60 of the applicator assembly, advancing a sheet metal on the conveyor 36 through the applicator assembly in the direction of advancement 42; (h) monitoring the application of the web material from the selected roll 28 on a surface of the sheet metal 30 as the sheet metal is advanced on the conveyor through the applicator assembly; (i) while the web material is being applied to the surface of the sheet metal, via diameter sensors 141, measuring at least one of a diameter of the selected roll, and an amount of web material unwound from the selected roll; (j) cut the web across a length of the roll to separate the web from the sheet metal; (k) move the picker assembly on the first and second slide assemblies adjacent the selected roll in unwind stand of the applicator assembly; (l) remove the selected roll from the unwind stand by disengaging the end effector of the mandrel of the selected roll from the roll holder of the unwind stand, engaging the end effector of the mandrel of the selected roll with the roll clamp of the picker assembly, and moving the picker assembly with the selected roll on the first and second slide assemblies from the unwind stand of the applicator assembly to a selected location in the storage assembly; (m) moving the picker assembly on the first and second slide assemblies adjacent a further selected roll in a further selected location in the storage assembly; (n) with a roll clamp of the picker assembly, engaging an end effector of the mandrel of the further selected roll; (o) moving the picker assembly with the further selected roll on the first and second slide assemblies from the storage assembly to the unwind stand of the applicator assembly; (p) engaging the end effector of the mandrel of the further selected roll with the roll holder of the unwind stand and disengaging the end effector of the mandrel of the further selected roll from the roll clamp; (q) after a leading edge of the web material from the further selected roll is threaded about the applicator roller of the applicator assembly, advancing a further sheet metal on the conveyor through the applicator assembly; (r) monitoring application of the web material from the further selected roll on a surface of the further sheet metal as the further sheet metal is advanced on the conveyor through the applicator assembly; and(s) while the web material of the further selected roll is being applied to the surface of the further sheet metal, via diameter sensors adjacent the unwind stand, measuring at least one of a diameter of the further selected roll, and an amount of web material unwound from the further selected roll.

As set forth herein, the sheet metal processing cell solves the drawbacks of the prior art and facilitates roll changeover and automates several other functions to streamline operations and logistics, including ordering of replacement rolls, storage, monitoring quality and use rates. While the line is running and a roll is being unwound in the unwind stand, the transfer assembly may be used to move new rolls with installed mandrels into position into the storage assembly from a loading cart, and depleted or seldomly used rolls may be removed from the storage assembly and disassembled from their respective mandrels and moved to remote storage location in the facility. The sheet metal processing cell allows facility operators to partially use and then return a roll to the in-line storage assembly for later reuse. The ability to dispense a limited amount of web material for a small size run or job, return the partial roll to in-line storage assembly automatically and then selectively retrieve the next roll from one of many in the in-line storage assembly, along with tracking characteristics of each individual roll, is advantageous over conventional systems. The sheet metal processing cell allows the facility operator to exchange multiple rolls of different types of material quickly and on demand. The applicator assembly, storage assembly, and transfer assembly may arranged in such a way as to allow use of facility equipment to load/remove rolls from the cell. For instance, the elements of the applicator assembly, storage assembly, and transfer assembly may be arranged to allow an overhead or jib crane to load/remove rolls from the storage assembly and/or applicator assembly. As an example, in the event a roll web material is required but not stored in the storage assembly, a crane may be used to allow the roll to be directly loaded into an open storage location or a run position in the unwind stand of the applicator assembly.

In the description above, the principle and embodiments of the present application are illustrated herein by specific examples. The description of the above embodiments is only intended to facilitate the understanding of the method and the concept of the present application. For those skilled in the art, changes can be made to specific embodiments and an application scope of the present application, according to the concepts of the application. In conclusion, contents of the specification should not be construed as limitation to the present application.

What is claimed is:

1. A sheet metal processing cell for applying a web material to a surface of a sheet metal being processed in the sheet metal processing cell, wherein the web material is unwound from a convolutely wound roll of the web material and the roll is rotatably supported by a mandrel, the sheet metal processing cell comprising:
an applicator assembly, the applicator assembly comprising:
a conveyor on which the sheet metal moves through the processing cell in a direction of advancement;
an unwind stand adjacent to the conveyor, the unwind stand being adapted and configured to receive the mandrel;
an applicator roller spaced from the conveyor, the applicator roller being adapted and configured to receive the web material from the roll of wound web material and apply the web material to the sheet metal being conveyed on the conveyor;
a storage assembly, the storage assembly comprising a storage structure, the storage structure disposed above the conveyor, the storage structure including a plurality mounts, the mounts being adapted and configured to support the mandrel; and
a transfer assembly, the transfer assembly comprising:
a picker assembly, the picker assembly being adapted and configured to move between the applicator assembly and the storage assembly and transfer the mandrel between the unwind stand and the mounts in the storage structure, the picker assembly having a roll clamp assembly, the roll clamp assembly being adapted and configured to engage and disengage from the mandrel when the picker assembly transfers the mandrel to and from the unwind stand and when the picker assembly transfers the mandrel to and from the mounts in the storage structure;
a first slide assembly adapted and configured to move the picker assembly in a first direction relative to the direction of advancement as the picker assembly moves between the applicator assembly and the storage assembly;
a second slide assembly adapted and configured to move the picker assembly in a second direction relative to the direction of advancement as the picker assembly moves between the applicator assembly and the storage assembly.

2. The sheet metal processing cell of claim 1, wherein when the mandrel is received in the unwind stand, the mandrel is positioned in a manner such that a center axis of the mandrel is transverse to the direction of advancement.

3. The sheet metal processing cell of claim 1, wherein the unwind stand is adapted and configured to move transversely relative to the direction of advancement of the sheet metal to thereby align the web material relative the sheet metal.

4. The sheet metal processing cell of claim 1, wherein the first slide assembly is configured to move the picker vertically upward and downward.

5. The sheet metal processing cell of claim 1 wherein the second slide assembly is configured to move the picker assembly in a direction parallel to the direction of advancement.

6. The sheet metal processing cell of claim 1, wherein the picker assembly comprises a lateral support structure and the second slide assembly is mounted to the lateral support structure.

7. The sheet metal processing cell of claim 6, wherein the picker assembly comprises a sub-plate, the sub-plate is adapted and configured to translate on the second slide assembly relative to the lateral support structure, and the roll clamp assembly is operatively mounted to the sub-plate.

8. The sheet metal processing cell of claim 7, wherein the picker assembly comprises a pivot mechanism, the pivot mechanism is mounted to the sub-plate, the pivot mechanism is adapted and configured to rotate the roll clamp assembly relative to the sub-plate.

9. The sheet metal processing cell of claim 7, wherein the picker assembly includes a drive motor operatively connected to an endless loop and adapted and configured for moving the endless loop, the endless loop extends across the lateral support structure, the sub-plate is mounted to the endless loop in a manner such that operation of the drive motor enables the sub-plate to translate on the second slide assembly via the endless loop.

10. The sheet metal processing cell of claim 6, wherein the lateral support structure is operatively mounted to the first slide assembly.

11. The sheet metal processing cell of claim 10, wherein the picker assembly includes a linear actuator for moving the lateral support structure on the first slide assembly.

12. The sheet metal processing cell of claim 1, wherein the storage structure comprises a plurality of racks, each rack has at least one of the mounts in the plurality of mounts.

13. The sheet metal processing cell of claim 12, wherein at least one rack in the plurality of racks is arranged vertically relative to another rack in the plurality of racks.

14. The sheet metal processing cell of claim 12, wherein at least one rack in the plurality of racks is arranged horizontally relative to another rack in the plurality of racks.

15. The sheet metal processing cell of claim 12, wherein at least one rack in the plurality of racks is arranged to support the mandrel in a direction transverse to the direction of advancement.

16. The sheet metal processing cell of claim 12, wherein at least one rack in the plurality of racks is arranged to support the mandrel above the conveyor.

17. The sheet metal processing cell of claim 1, wherein the unwind stand comprises a holder assembly, the holder assembly being configured to cooperate with the roll clamp to enable transfer of the mandrel between the roll clamp and the holder assembly.

18. The sheet metal processing cell of claim 1, further comprising a control, the control being adapted and configured for controlling motion of picker assembly, the control having a memory and processor, the processor being adapted to store in the memory data representative of at least one the following:
a diameter of the roll,
a width of the roll;

a caliper of the web material of the roll;
an amount of web material unwound from the roll during last use of the roll;
a location of the roll in the storage structure;
a material characteristic of the web material; and
a processing job associated with the roll.

19. A method of applying a web material to a surface of a sheet metal being processed in the sheet metal processing cell, the method comprising:
moving a picker assembly on first and second slide assemblies into a storage assembly storing a plurality of convolutely wound rolls of the web material each rotatably supported on a mandrel, the first slide assembly being adapted and configured to move the picker assembly vertically in the cell, the second slide assembly being adapted and configured to move the picker assembly in the cell in a direction parallel to the direction of advancement;
moving the picker assembly adjacent a selected roll in the storage assembly;
with a roll clamp of the picker assembly, engaging an end effector of the mandrel of the selected roll;
moving the picker assembly with the selected roll on the first and second slide assemblies from the storage assembly to an unwind stand of an applicator assembly;
placing the selected roll in the unwind stand with the picker assembly;
securing the selected roll in the unwind stand by engaging the end effector of the mandrel of the selected roll with a roll holder of the unwind stand and disengaging the end effector of the mandrel of the selected roll from the roll clamp;
threading a leading edge of the web material from the selected roll about an applicator roller of the applicator assembly;
advancing a sheet metal on a conveyor through the applicator assembly in a direction of advancement; and
applying the web material from the selected roll on a surface of the sheet metal as the sheet metal is advanced on the conveyor through the applicator assembly.

20. The method of claim 19, further comprising while applying the web material to the surface of the sheet metal, measuring at least one of a diameter of the selected roll, and an amount of web material unwound from the selected roll.

21. The method of claim 19, further comprising with a processor associated with a control adapted and configured for controlling motion of picker assembly, storing in a memory of the control, data representative of at least one the following:
a diameter of the selected roll,
a width of the selected roll;
a caliper of the web material of the selected roll;
an amount of web material unwound from the selected roll during last use of the roll;
a location of the selected roll in the storage structure; and
a material characteristic of the web material of the selected roll.

22. The method of claim 19, further comprising stopping advancement of the sheet metal on the conveyor;
cutting the web across a length of the roll to separate the web from the sheet metal;
moving the picker assembly on the first and second slide assemblies adjacent the selected roll in unwind stand of the applicator assembly;
removing the selected roll from the unwind stand by disengaging the end effector of the mandrel of the selected roll from the roll holder of the unwind stand, engaging the end effector of the mandrel of the selected roll with the roll clamp of the picker assembly, and moving the picker assembly with the selected roll on the first and second slide assemblies from the unwind stand of the applicator assembly to a selected location in the storage assembly.

23. The method of claim 22, further comprising:
moving the picker assembly on the first and second slide assemblies adjacent a further selected roll in a further selected location in the storage assembly;
with a roll clamp of the picker assembly, engaging an end effector of the mandrel of the further selected roll;
moving the picker assembly with the further selected roll on the first and second slide assemblies from the storage assembly to the unwind stand of the applicator assembly;
engaging the end effector of the mandrel of the further selected roll with the roll holder of the unwind stand and disengaging the end effector of the mandrel of the further selected roll from the roll clamp;
threading a leading edge of the web material from the further selected roll about the applicator roller of the applicator assembly;
advancing a further sheet metal on the conveyor through the applicator assembly; and
applying the web material from the further selected roll on a surface of the further sheet metal as the further sheet metal is advanced on the conveyor through the applicator assembly.

24. The method of claim 23, further comprising while applying the web material of the further selected roll to the surface of the sheet metal, measuring at least one of a diameter of the further selected roll, and an amount of web material unwound from the further selected roll.

25. The method of claim 24, further comprising with the processor associated with the control, storing in the memory of the control, data representative of at least one the following:
a diameter of the further selected roll;
a width of the further selected roll;
a caliper of the web material of the further selected roll;
an amount of web material unwound from the further selected roll during last use of the roll;
a location of the further selected roll in the storage structure; and
a material characteristic of the web material of the further selected roll.

26. The method of claim 19, wherein the step of placing the selected roll in the unwind stand comprises positioning the mandrel such that a center axis of the mandrel is transverse to the direction of advancement.

27. The method of claim 19, further comprising moving the unwind stand transversely relative to the direction of advancement of the sheet metal to align the web material relative the sheet metal.

28. The method of claim 19, wherein the step of moving the picker assembly with the selected roll from the storage assembly to the unwind stand comprises moving a sub-plate operatively connected with the roll clamp relative to a support structure supporting the second slide assembly.

29. The method of claim 28, further comprising pivoting the roll clamp relative to the sub-plate.

* * * * *